United States Patent
Sadek et al.

(10) Patent No.: US 12,268,911 B2
(45) Date of Patent: Apr. 8, 2025

(54) SPRINKLER BULB

(71) Applicant: Marioff Corporation Oy, Vantaa (FI)

(72) Inventors: Mikolaj Jakub Sadek, Gdansk (PL);
Nazar Krutskevych, Pomorske (PL);
Wojciech Dominik Zimny, Gdansk (PL)

(73) Assignee: MARIOFF CORPORATION OY, Vantaa (FI)

( * ) Notice: Subject to any disclaimer, the term of this patent is extended or adjusted under 35 U.S.C. 154(b) by 551 days.

(21) Appl. No.: 16/902,975

(22) Filed: Jun. 16, 2020

(65) Prior Publication Data
US 2020/0391064 A1 Dec. 17, 2020

(30) Foreign Application Priority Data

Jun. 17, 2019 (EP) .................................... 19180660

(51) Int. Cl.
*A62C 37/50* (2006.01)
*A62C 37/11* (2006.01)
*G01L 9/00* (2006.01)

(52) U.S. Cl.
CPC .............. *A62C 37/50* (2013.01); *A62C 37/11* (2013.01); *G01L 9/0005* (2013.01)

(58) Field of Classification Search
CPC ........ A62C 37/50; A62C 37/11; G01L 9/0005
See application file for complete search history.

(56) References Cited

U.S. PATENT DOCUMENTS

| 3,884,304 A | * | 5/1975 | Messerschmidt .... | A62C 35/605 340/517 |
| 4,523,474 A | * | 6/1985 | Browne ................ | G01L 9/0005 361/283.4 |
| 4,741,214 A | * | 5/1988 | Vidmantas ............ | G01L 13/025 73/718 |
| 5,050,035 A | * | 9/1991 | Hegner ................. | G01L 9/0075 361/283.4 |
| 5,301,553 A | * | 4/1994 | Schultz ............... | B60C 23/0408 73/705 |

(Continued)

FOREIGN PATENT DOCUMENTS

| CN | 1754588 A | 4/2006 |
| CN | 107014438 A | 8/2017 |

(Continued)

OTHER PUBLICATIONS

Takahata, et al. "Micromachined Capacitive Pressure Sensor Using a Cavity-Less Structure with Bulk-Metal/Elastomer Layers and Its Wireless Telemetry Application", Sensors, vol. 8, No. 4, Apr. 2, 2008, pp. 2317-2330. (Year: 2008).*

(Continued)

*Primary Examiner* — Joseph A Greenlund
(74) *Attorney, Agent, or Firm* — CANTOR COLBURN LLP

(57) ABSTRACT

The invention relates to a sprinkler bulb comprising a sealed frangible housing 110, and a circuit device 120 within the housing, wherein the circuit device comprises a capacitor 150 arranged to be used as a pressure sensor. The invention also relates to a method of measuring pressure inside a sprinkler bulb using a capacitor 150 of the circuit device 120 within a housing 110 of the bulb as a pressure sensor.

15 Claims, 4 Drawing Sheets

(56) References Cited

U.S. PATENT DOCUMENTS

| | | | | | |
|---|---|---|---|---|---|
| 5,317,918 | A * | 6/1994 | Lew | ............... | G01L 9/003 |
| | | | | | 73/718 |
| 5,485,345 | A * | 1/1996 | Lukasiewicz | ......... | G01L 9/0075 |
| | | | | | 361/283.4 |
| 5,513,708 | A * | 5/1996 | Sundholm | .......... | A62C 99/0072 |
| | | | | | 251/282 |
| 5,622,225 | A * | 4/1997 | Sundholm | .............. | A62C 37/14 |
| | | | | | 169/61 |
| 5,628,367 | A * | 5/1997 | Truax | ..................... | A62C 37/14 |
| | | | | | 169/37 |
| 6,491,110 | B2 * | 12/2002 | Gil | ........................ | A62C 37/11 |
| | | | | | 169/42 |
| 6,715,360 | B1 * | 4/2004 | Pepperling | .......... | G01L 19/0663 |
| | | | | | 73/756 |
| 6,789,429 | B2 | 9/2004 | Pinto et al. | | |
| 7,383,737 | B1 | 6/2008 | Lin et al. | | |
| 7,568,395 | B2 | 8/2009 | Silverbrook et al. | | |
| 7,765,875 | B2 * | 8/2010 | Guo | ....................... | G01L 23/125 |
| | | | | | 73/718 |
| 8,656,785 | B1 * | 2/2014 | Shaw | ...................... | G01L 15/00 |
| | | | | | 73/715 |
| 8,984,952 | B2 * | 3/2015 | Barron | .................... | G01L 19/04 |
| | | | | | 73/718 |
| 9,012,103 | B2 * | 4/2015 | Heise | .................... | F16K 17/383 |
| | | | | | 429/442 |
| 9,259,601 | B2 * | 2/2016 | Zlatintsis | ................. | F16K 17/38 |
| 10,518,119 | B2 * | 12/2019 | Klug | .......................... | A62C 35/10 |
| 2002/0053440 | A1 * | 5/2002 | Gil | ........................ | A62C 37/11 |
| | | | | | 169/56 |
| 2004/0194976 | A1 * | 10/2004 | Kretzschmar | .......... | A62C 37/14 |
| | | | | | 169/42 |
| 2007/0074579 | A1 | 4/2007 | Cook et al. | | |
| 2007/0240886 | A1 * | 10/2007 | Kil | ........................ | A62C 37/50 |
| | | | | | 169/39 |
| 2008/0217572 | A1 * | 9/2008 | Job | ........................ | F16K 17/38 |
| | | | | | 251/337 |
| 2013/0220650 | A1 * | 8/2013 | Muller | ................... | A62C 37/14 |
| | | | | | 169/58 |
| 2014/0220469 | A1 * | 8/2014 | Heise | ................ | H01M 8/04201 |
| | | | | | 137/72 |
| 2017/0304664 | A1 * | 10/2017 | Tanklevski | .............. | A62C 37/14 |
| 2017/0328799 | A1 * | 11/2017 | Stilwell | ................... | A62C 35/68 |
| 2018/0200552 | A1 * | 7/2018 | Wertsberger | ........... | A62C 37/40 |
| 2018/0361183 | A1 * | 12/2018 | Tanklevski | .............. | A62C 37/04 |
| 2019/0344110 | A1 * | 11/2019 | Tanklevskij | ........... | A62C 31/28 |
| 2020/0129798 | A1 * | 4/2020 | Klug | ...................... | A62C 37/14 |
| 2020/0203111 | A1 * | 6/2020 | Böke | ...................... | A62C 37/50 |
| 2020/0276464 | A1 * | 9/2020 | Krutskevych | .......... | A62C 37/50 |
| 2020/0391064 | A1 * | 12/2020 | Sadek | .................... | A62C 37/50 |
| 2021/0086010 | A1 * | 3/2021 | Sadek | .................... | A62C 37/44 |
| 2021/0197003 | A1 * | 7/2021 | Krutskevych | .......... | A62C 31/28 |
| 2021/0228925 | A1 * | 7/2021 | Krutskevych | .......... | A62C 37/44 |
| 2021/0299501 | A1 * | 9/2021 | Krutskevych | .......... | A62C 37/50 |

FOREIGN PATENT DOCUMENTS

| | | |
|---|---|---|
| DE | 4013887 A1 | 11/1990 |
| EP | 1071934 B1 | 2/2002 |
| EP | 2113760 A1 | 11/2009 |
| WO | 2018088937 A1 | 5/2018 |

OTHER PUBLICATIONS

European Search Report for application EP 19180660.3, dated Dec. 5, 2019, 6 pages.

Chinese Office Action for Application No. 202010553980.3; dated Feb. 23, 2023; 7 Pages.

Yao, Yongxi; "Water Resources Information Monitoring and Transmission Application Technology", Zhengzhou: Henan University Press, Apr. 2013, first edition, p. 72. (with English Abstract).

European Oral Proceedings for Application 19180660.3, Issued Mar. 27, 2024, pp. 8.

Kumar et al.; "Crack Detection in Pipelines Using Capacitive Sensors"; IJESRT; Department of Electronics and Communication Engineering; pp. 267-274; Apr. 2013.

Takahata, et al. "Micromachined Capacitive Pressure Sensor Using a Cavity-Less Structure with Bulk-Metal/Elastomer Layers and Its Wireless Telemetry Application", Sensors, vol. 8, No. 4, Apr. 2, 2028, pp. 2317-2330.

Takahata, et al. "Micromachined Capacitive Pressure Sensor Using a Cavity-Less Structure with Bulk-Metal/Elastomer Layers and Its Wireless Telemetry Application", Sensors, vol. 8, No. 4, Apr. 2, 2008, pp. 2317-2330.

* cited by examiner

SPRINKLER BULB

FOREIGN PRIORITY

This application claims priority to European Patent Application No. 19180660.3, filed Jun. 17, 2019, and all the benefits accruing therefrom under 35 U.S.C. § 119, the contents of which in its entirety are herein incorporated by reference.

FIELD

The invention relates to a sprinkler bulb for a sprinkler, particularly to a sprinkler bulb comprising a circuit device therein, and methods of testing the sprinkler bulb.

BACKGROUND

Fire suppression systems typically include sprinkler devices arranged to expel fluid for suppressing or preventing fire. Sprinkler devices typically include bulbs which are arranged to break at predetermined temperatures and thereby cause the sprinkler to emit the fire suppression fluid. In order to function correctly, the bulb of the sprinkler device must break under prearranged circumstances which occur in the event of a fire. The bulb is therefore a critical component of a sprinkler device.

Modern fire suppression systems may be configured to monitor sprinklers e.g. to ensure they are in working order, to track their position for determining the location of a fire etc. Sprinkler devices may therefore be provided with suitable sensors and circuitry installed. However, the operation of sprinkler bulbs is still mechanical and inspection of sprinkler bulbs in the field is still a manual task, and typically requires that the bulb be inspected by eye for damage or other flaws. Given the importance of the bulb, improvements to bulb monitoring process are desirable.

SUMMARY

According to a first aspect of the invention there is provided a sprinkler bulb comprising a sealed frangible housing, and a circuit device within the housing, wherein the circuit device comprises a capacitor arranged to be used as a pressure sensor.

The sprinkler bulb may be for use in a sprinkler device and/or for use in a fire suppression system or the like. The sprinkler device and/or fire suppression system may be conventional devices or systems. The sprinkler bulb may be arranged so that the housing cracks or otherwise breaks under predetermined conditions, for example predetermined conditions indicative of a fire event, so that the sprinkler bulb may be used for activating the sprinkler device and/or fire suppression system when the predetermined conditions are met. For example, the sprinkler bulb may be configured to shatter when its temperature reaches a predetermined threshold. The sprinkler bulb may be arranged so that when it is intact it may support a predetermined mechanical load, e.g. for holding a seal or plug of a sprinkler device in place to prevent release of fire suppressant.

The sealed frangible housing may contain fluid and may contain liquid and/or gas. The fluid may therefore be sealed within the housing and the housing may be hermetically sealed. The housing may be configured to break when the pressure of the liquid reaches a predetermined threshold. Since liquid pressure and temperature are related, the housing may be configured to break when the liquid reaches a predetermined temperature. The housing and liquid and/or gas may be arranged so that the housing will break under predetermined conditions and the sprinkler bulb will cease to be able to support mechanical load for preventing release of fire suppressant. The housing may be formed of any suitable material, and may be formed of quartzoid.

The circuit device may be disposed within the fluid in the housing, and may be freely disposed within the fluid and may not be attached or otherwise mechanically coupled to the housing. The circuit device may not interfere with or otherwise affect the function of the sprinkler bulb in breaking under predetermined conditions.

The circuit device may be arranged to detect a change in capacitance of the capacitor. The capacitor may thereby be arranged for use as a pressure sensor. Pressure changes within the housing will affect the structure and dimensions of the capacitor and thereby cause its capacitance to change. That is, the capacitor may deform under pressure. Therefore changes in the capacitance of the capacitor may be indicative of pressure changes within the housing e.g. of the liquid contained in the housing. The circuit device may comprise a control unit configured to monitor changes in the capacitance of the capacitor and thereby use the capacitor as a pressure sensor.

The capacitor may comprise a plurality of conductive layers separated by a predetermined distance, and the capacitor may be arranged to deform under pressure so that the predetermined distance changes. The capacitor may be a standard capacitor, and fundamentally may comprise at least two electrodes held spatially separated from one another. Changes in the predetermined distance between the layers of the capacitor will result in changes of its capacitance. The predetermined distance between layers of the capacitor may be reduced with increasing pressure. The conductive layers may be substantially planar and the predetermined distance between adjacent layers may be substantially constant e.g. at ambient pressure. That is, the conductive layers may be substantially parallel to one another.

The capacitor may be a first capacitor, and the circuit device may comprise a wireless unit for wirelessly receiving power and/or signals from outside the housing, and the wireless unit may comprise a second capacitor. Therefore the circuit device may comprise two capacitors, the first of which is arranged for use as a pressure sensor, and the second of which may be arranged to be used for wirelessly receiving power and/or signals from outside the housing. The second capacitor may be part of an LC circuit or the like.

A change in a capacitance of the first capacitor with pressure may be greater than a change in a capacitance of the second capacitor with pressure. The capacitance of the second capacitor may be substantially constant over a working pressure range of the sprinkler bulb. For example, pressures within the housing may be expected to range during use between approximately 0 to 2.5 MPa (0 to 25 bar) and the capacitance of the second capacitor may be substantially constant over these pressures. In contrast, the capacitance of the first capacitor may vary measurably with the pressure over this range. Therefore the first capacitor may be sensitive to pressure changes within the working pressure ranges of the sprinkler bulb, and second capacitor may be substantially insensitive to pressure changes within the working pressure ranges of the sprinkler bulb. As such the efficiency of the wireless unit e.g. of the LC circuit, will be substantially unaffected by pressure changes of the liquid within the housing of the sprinkler bulb.

The first and second capacitors may both be of the same type, for example they may have similar structures and function in substantially the same manner.

The first capacitor may have a greater surface area than the second capacitor. The first capacitor may therefore be more sensitive to pressure changes than is the second capacitor, and hence may deform more than the second capacitor for the same increase of pressure. The first capacitor may have a surface area more than twice that of the second capacitor, or may have a surface area more than four times that of the second capacitor. The first capacitor may have a surface area more than six times that of the second capacitor. The first capacitor may have a surface area more than ten times that of the second capacitor, more than fifty times that of the second capacitor, or more than a hundred times that of the second capacitor.

The first and/or second capacitor(s) may be a simple capacitor. That is, either or both of the capacitors may not be specifically adapted for use as anything other than a simple capacitor. The first capacitor may not be specifically adapted for use as a pressure sensor. Either or both of the first and/or second capacitor may be manufactured and intended for use only has a capacitor. Therefore, the circuit device may be arranged to detect pressure changes within the housing without the need for specially adapted pressure sensing components.

The first capacitor may be selected from a standard size of capacitors, and the second capacitor may be selected from a standard size of capacitors. The first capacitor may be one standard size larger than the second capacitor, or may be a plurality of standard sizes larger than the second capacitor. The first capacitor may be a 0805 capacitor (i.e. 2.0 mm by 1.25 mm), and the second capacitor may be a 0402 capacitor (i.e. 1.0 mm by 0.5 mm), or a 0201 capacitor (e.g. 0.6 mm by 0.3 mm).

The capacitor may not comprise a fluid chamber and/or a diaphragm. The capacitor may not comprise a volume therein in fluid communication with its exterior. The interior of the capacitor may be entirely solid. The capacitor may not comprise any cavities or chambers therein. The capacitor may not comprise any hollow volumes or any volumes for containing fluid.

The sprinkler bulb may have a conventional size and may be relatively small. Known pressure sensors may not be suitable for use in a sprinkler bulb, for example by being too large or not suitably shaped, by not being sufficiently reliable, by not being sensitive to pressure changes over a sufficient range, and/or by being prohibitively expensive for use in a single use item such as sprinkler bulb. In the sprinkler bulb described herein, a simple capacitor is used in place of a specially adapted pressure sensor or the like, because a capacitor is sufficiently sized to be housed within the sprinkler bulb housing, is sufficiently reliable, is sensitive to pressure changes over a sufficient range, and is relatively cheap.

The capacitor (e.g. the first capacitor) may be arranged to measure pressure up to about 2.5 MPa. For example the capacitor may be arranged so that its capacitance changes measurably when exposed to pressures from about 0 to 25 bar (i.e. about 0 to about 2.5 MPa).

The circuit device may comprise a heating element operable to heat fluid e.g. liquid within the housing of the sprinkler bulb. The circuit device may comprise a temperature sensor arranged to monitor the temperature of liquid within the housing. The circuit device may comprise a power source arranged to supply power to components of the circuit device. The wireless unit e.g. the LC circuit may be arranged to receive power from outside the housing and charge the power source. The circuit device may comprise a control unit (e.g. the control unit described above) arranged to control operation of the circuit device including components of the circuit device. The control unit may be configured to send signals using the wireless unit. The circuit device may therefore communicate with components outside the housing of the bulb.

The sprinkler bulb according to the first aspect of the present invention may be arranged to test its own integrity e.g. to test if it is cracked and/or otherwise unsuitable for use. It may communicate results of the test to a remote control system, and may perform the test under instructions from that remote system. It may also receive power remotely. The sprinkler bulb may therefore be part of the so-called Internet of Things.

During a test, the circuit device may operate the heater element to start heating the liquid in the housing of the bulb. The circuit device may then monitor the pressure within the housing to ensure that it continues to increase with increasing temperature, thereby indicating that the bulb would be likely to break from the increasing pressure if heated by a fire event. If the pressure within the bulb increases as expected, the bulb may be determined to be in working order and safe for use. If on the other hand the pressure within the bulb increases only a small amount and/or does not increase with increasing temperature, the housing may be structurally unsound and may comprise a crack or the like so that pressure within the housing is being released and will never reach a level high enough to cause the bulb to break. In that case, the sprinkler bulb may be determined not to be in working order and may be unsafe for use.

According to a second aspect of the invention, there is provided a sprinkler device comprising a sprinkler bulb as described herein with reference to the first aspect of the invention, wherein the bulb is arranged to prevent release of a suppressant unless it breaks. For example, the bulb may hold a seal of the sprinkler device in place while its integrity is sound, so that upon the housing of the bulb breaking (e.g. cracking) the seal is no longer held in place and suppressant is released from sprinkler device.

The sprinkler device may be arranged to transmit and/or receive power and/or signals to and from and the wireless unit of the circuit device. The sprinkler device may therefore communicate with the circuit device e.g. via the wireless unit of the circuit device. The sprinkler device may be arranged to control any and all of the components of the circuit device e.g. by controlling the control unit of the circuit device.

According to a third aspect of the present invention there is provided a sprinkler system comprising a sprinkler bulb as described herein with reference to the first aspect invention, or a sprinkler device as described herein with reference to the second aspect invention, comprising a system controller arranged to cause the circuit device of the sprinkler bulb to heat fluid in the bulb, to measure the pressure of fluid within the bulb using the capacitor, and to determine that the bulb is in working condition if the measured pressure reaches a predetermined threshold, and/or to determine that the bulb is not in working condition if the measured pressure does not reach the predetermined threshold.

Other conditions may need to be satisfied for the bulb to be determined to be in working order. For example, the pressure may need to increase by a predetermined amount upon being heated for a predetermined time. The pressure may need to be at or above a predetermined threshold when the liquid is at a predetermined temperature. Different tests may be suitable for different bulbs and/or systems.

The sprinkler bulb may permit reliable and cost-effective automated testing of sprinkler bulb integrity. The testing may be carried out under control of the control unit of the circuit device, and/or under control of the system controller of the sprinkler system, and/or under control of any suitable controller.

The sprinkler system may comprise a plurality of sprinkler devices and/or a plurality of sprinkler bulbs arranged in respective sprinkler devices. The system controller may be arranged to periodically test sprinkler bulbs to determine whether or not they are in working condition. The system controller may be arranged to alert a used if a sprinkler bulb is determined not to be in working order.

According to a fourth aspect of the present invention there is provided a method of measuring pressure inside a sprinkler bulb comprising a sealed frangible housing, and a circuit device within the housing, the method comprising using a capacitor of the circuit device as a pressure sensor.

The method may comprise determining a pressure change within the housing based on a change of capacitance of the capacitor. The method may comprise using a simple or standard capacitor as a pressure sensor.

The capacitor may be a first capacitor, and the method may comprise providing a wireless unit for wirelessly receiving power and/or signals from outside the housing as part of the circuit device, and providing as part of the wireless unit a second capacitor having a capacitance less sensitive to pressure changes than the first capacitor.

The second capacitor may have a surface area less than that of the first capacitor. The method may include providing the first capacitor to have more than twice the surface area of the second capacitor, more than four times the surface area, or more than six times the surface area.

The method may comprise using a sprinkler bulb as described herein with reference to the first aspect of the invention, a sprinkler device as described herein with reference to the second aspect of the invention, and/or a sprinkler system as described herein with reference to the third aspect of the invention.

According to a fifth aspect of the present invention there is provided a method of testing a sprinkler bulb comprising the method of measuring pressure described herein with reference to the fourth aspect of the invention, further comprising heating fluid in the housing and determining the bulb is in working order if pressure in the housing reaches a predetermined threshold, and/or determining the bulb is not in working order if pressure in the housing does not reach the predetermined threshold.

The method may comprise periodically testing the sprinkler bulb, and may comprise outputting a warning if the sprinkler bulb is determined not to be in working order. The method may comprise simultaneously testing a plurality of sprinkler bulbs.

According to another aspect of the invention there is provided a pressure sensor device in a sealed housing, the pressure sensor device comprising a capacitor arranged to be used as a pressure sensor.

DRAWING DESCRIPTION

Certain embodiments of the invention are described below by way of example only and with reference to the figures in which.

DETAILED DESCRIPTION

Figure 1:
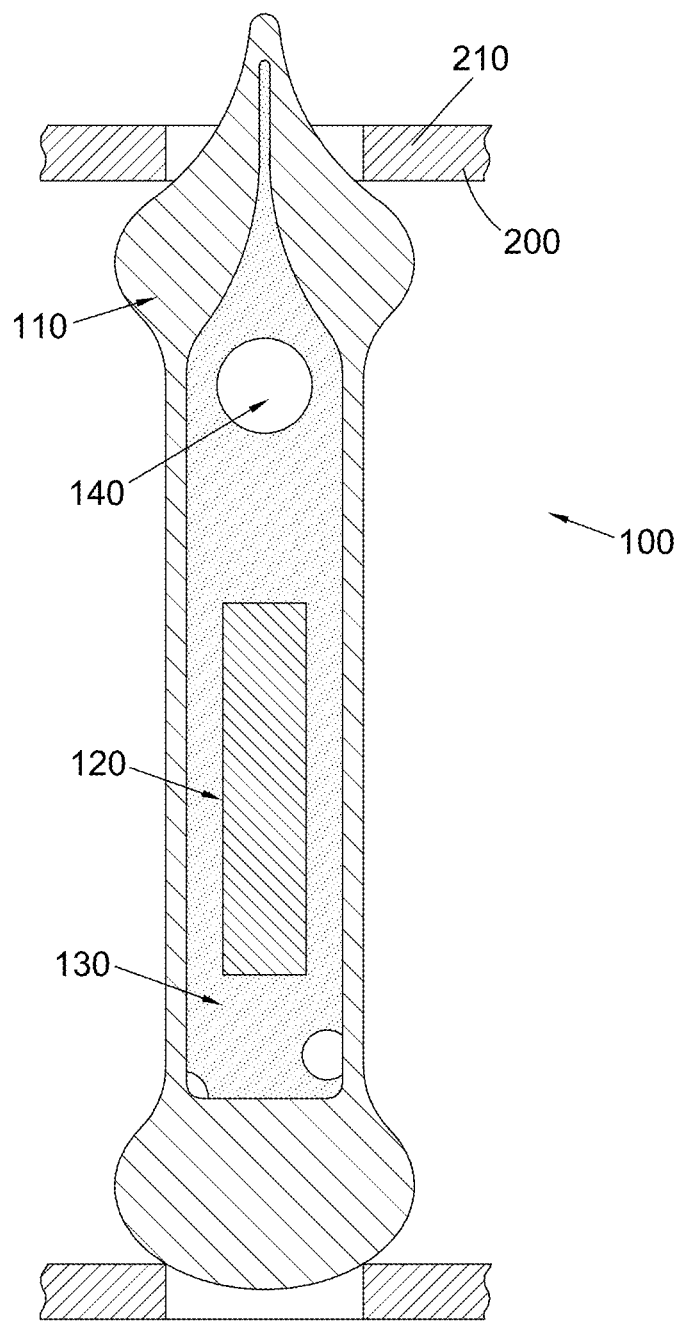
FIG. 1 shows a sprinkler bulb comprising a housing and a circuit device inside the housing.

FIG. 1 shows a sprinkler bulb 100 comprising a sealed frangible housing 110 and a circuit device 120 disposed within the housing 110. The circuit device 120 is therefore sealed inside the housing 110. The housing 110 also contains a liquid 130 and a gas bubble 140.

In use, the bulb 100 is located in a sprinkler device 200 (partially shown in FIG. 1), and is positioned to hold a seal, plug or the like in place to prevent fire suppression fluid from leaving the sprinkler device 200. The seal 210 of the sprinkler device 200 is shown in FIG. 1. In the event of a fire near the sprinkler device 200, the liquid 130 in the housing 110 will be heated and therefore pressure within the housing 110 will increase. Once the liquid 130 reaches a predetermined temperature (e.g. indicative of being near a fire), the resulting pressure from the heated liquid 130 will break the frangible housing 110 and the seal 210 of the sprinkler 200 will no longer held in place. Fire suppression fluid will then be discharged from the sprinkler device 200. The housing 110, liquid 130, and gas bubble 140 can be configured so that the housing 110 will break under predetermined conditions e.g. when the liquid 130 reaches a predetermined temperature. The housing 110 may be formed of any suitable material, and may be formed of quartzoid.

If the housing 110 of the bulb 100 is damaged, for example by a crack, pressure increases in the liquid 130 inside the housing 110 may be able to normalise with ambient pressure outside the housing 110. For example, liquid may leak out of the housing 110 and/or gas may leak into the housing 110. In that case, pressure within the housing 130 may not reach the level needed to cause the housing 110 to break, and therefore the sprinkler device 200 may not be able to discharge fire suppressing fluid in the event of a fire. Thus, damage to or cracks in the housing 110 can jeopardize operational safety of the sprinkler device 200. Even micro-cracks—which may not be visible to an unaided human eye—can prevent proper functioning of the sprinkler bulb 100.

Therefore, known methods of detecting cracks in sprinkler bulbs installed in sprinkler devices in the field—which methods typically involve inspection of the bulbs by eye—may not be sufficient to ensure that a sprinkler device is in working order, and hence may not ensure operational safety of a fire suppression system. Methods which do not involve inspecting bulbs by eye are also known, but are unsuitable for use outside laboratory or factory conditions and with bulbs installed on site, and are typically unsuitable for testing bulbs en mass. Given that sprinkler devices are safety-critical, improvements in regard to testing are desirable.

To address the above matters, the sprinkler bulb 100 of FIG. 1 comprises a circuit device 120 sealed within the housing 110. The circuit device 120 comprises a pressure sensor 150, a wireless unit 160 such as an LC circuit, a capacitor 162, a heating element 170, a temperature sensor 172, a control unit 180, and a power storage device 190.

The circuit device 120 is disposed within the housing 110. It is necessary for proper operation of the sprinkler bulb 100 that the housing 110 is sealed to prevent any and all leaks (e.g. to prevent ingress of any fluid into the housing 110, and/or prevent egress of any fluid out of the housing 110) otherwise the housing 110 may not break in the event of an emergency, as described above. The circuit device 120 is therefore sealed within the housing 110 and cannot simply be provided with external connections e.g. for power and/or communication.

The circuit device 120 is therefore provided with the wireless unit 160, for example an LC circuit. The LC circuit comprises an inductor 164 and a capacitor 162, and is used to generate and/or receive signals at a predetermined frequency (e.g. the resonant frequency of the LC circuit). The circuit device 120 may therefore receive signals over a certain bandwidth from outside the housing 110 of the bulb 100. Since the circuit device 120 also comprises a power storage device 190, it may receive and store power for its operation via the wireless unit 160 as needed, despite being sealed within the bulb housing 110. The circuit device 120 may also send and receive communication signals via the wireless unit 160, thereby being configured to communicate with other components of a fire suppression system outside the housing 110.

The housing 110 of the bulb 100 may be tested for cracks using the circuit device 120. The control unit 180 is configured to control operation of the circuit device 120, and during a test actives the heating unit 170 of the circuit device 120 (e.g. by drawing power from the power storage unit 190). The liquid 130 within the housing 110 is therefore heated by the heating device 170 and the temperature of the liquid 130 increases. The temperature may be monitored by the temperature sensor 172 connected to the control unit 180.

The resulting pressure increase of the liquid 130 is also monitored by the pressure sensor 150 connected to the control unit 180. If pressure within the housing 110 reaches a predetermined level (e.g. a pressure nearly sufficient to break the housing 110) after the liquid 130 has been heated for a time, the control unit 180 may then determine that there is no pressure loss and therefore that there are no cracks in the housing 110. Thus, the bulb 100 may be determined to be in working order. Alternatively, if the pressure within the housing 110 does not reach the predetermined level after the liquid 130 has been heated for a time, the control unit 180 may determine that there is a pressure loss and hence a crack or the like in the housing. The bulb 100 may then be determined not to be in working order.

The control unit 180 may control operation of the circuit device 120 autonomously, or may control operation of the circuit device 120 under the control of a remote system controller outside the housing 110 arranged to control e.g. a plurality of sprinkler devices and sprinkler bulbs. The control unit 180 may communicate with elements external to the bulb 100 via the wireless unit 160, and may be controlled by the remote system controller.

The pressure sensor 150 is therefore a safety-critical component and should be highly reliable. It should also be capable of detecting pressure changes over a relatively wide pressure range e.g. from about 0 bar (i.e. 0 Pa) to about 25 bar (i.e. 2.5 MPa). Further, sprinkler devices are typically a conventional size, and sprinkler bulbs therefore have a conventional size which is relatively small, so the pressure sensor should be sufficiently small and correctly shaped to be housed within a conventional sprinkler bulb. Finally, sprinkler bulbs are single use items so the cost of the pressure sensor should not be prohibitive.

Known pressure sensors are not suitable for use in sprinkler bulbs because they do not satisfy all of the above requirements. For example, some known pressure sensors are sensitive to pressure changes over a sufficiently wide range, but are too large for use within a conventional sprinkler bulb. Some known pressure sensors are sufficiently small for use in a conventional sprinkler bulb, but they are not sufficiently reliable. Some sensors may be sufficiently small and reliable, but are too costly to be commercially viable.

Figure 2:
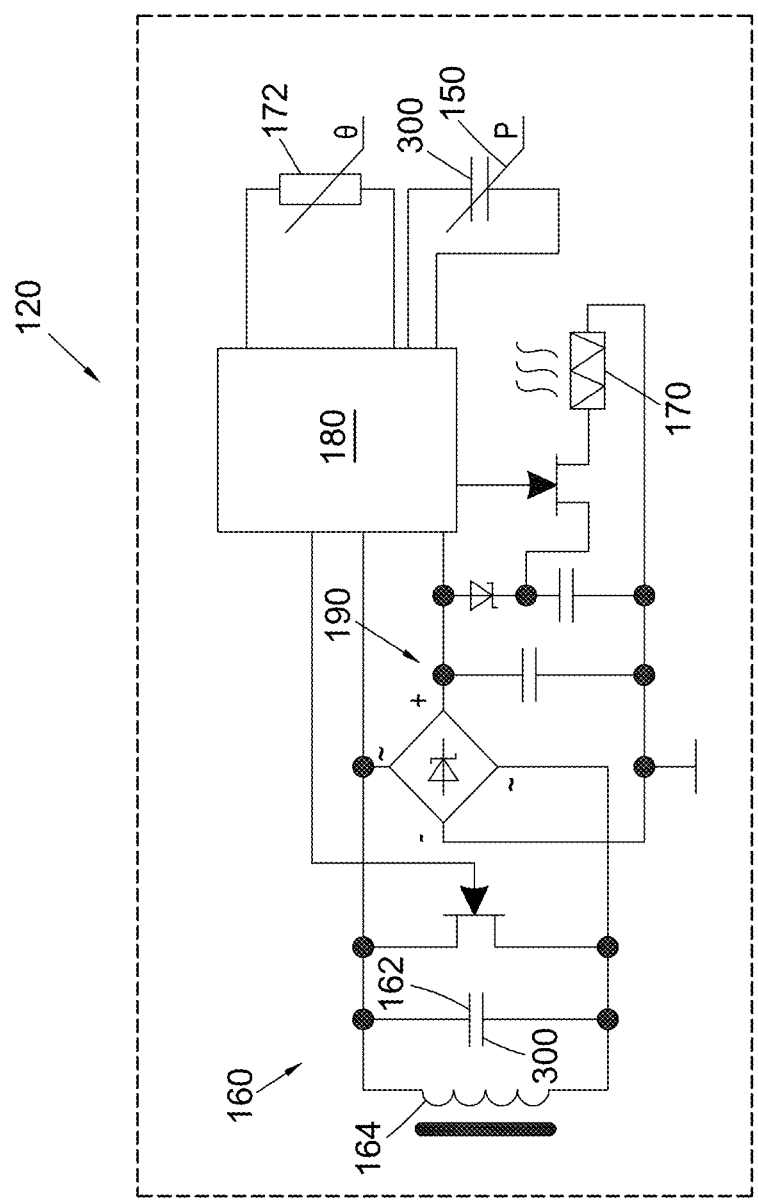
FIG. 2 shows a schematic circuit diagram of the circuit device shown in FIG. 1.

The pressure sensor 150 of the circuit device 120 of FIG. 2 is therefore provided by a standard capacitor 300. The capacitor 300 is sufficiently sized for use in a sprinkler bulb 100, is commercially viable, is sufficiently reliable, and is sensitive to a wide enough range of pressures to be used in bulb testing.

That is, the pressure sensor 150 is a simple, plain, common capacitor that is made only to function as a capacitor and is not specially adapted for use as a pressure sensor. It does not have a fluid chamber, a diaphragm, or any other cavity or hollow volume for containing fluid.

Figure 3A:
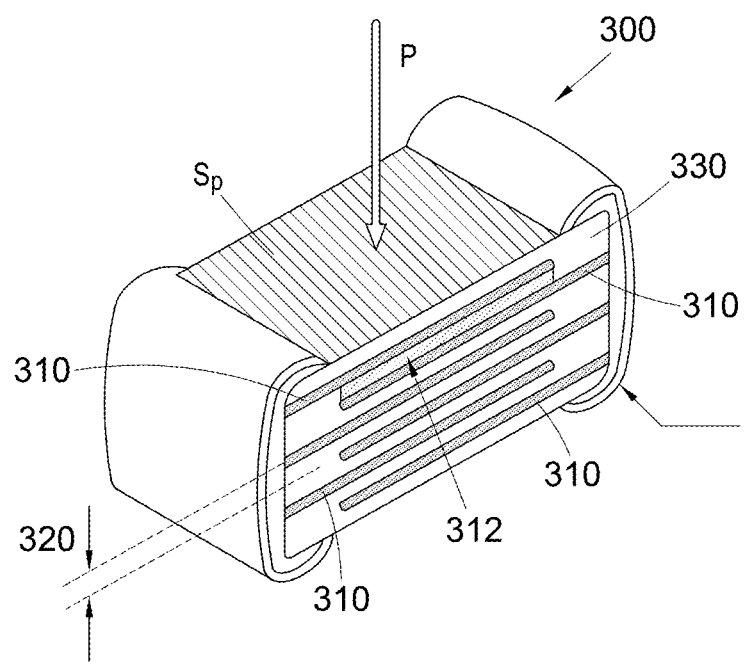
FIG. 3A shows a perspective view of a capacitor for use as a pressure sensor in the circuit device of FIG. 2.

An example of a standard capacitor 300 is shown in FIG. 3A, and comprises a plurality of conductive sheets 310 (i.e. electrodes) separated by a predetermined distance 320 using a dielectric material 330. An active area 312 of the capacitor is defined by an overlap of the conductive sheets 310. If the capacitor 300 is subjected to a change in pressure (shown e.g. by the arrow P in FIG. 3A) it will deform and the predetermined distance 320 between the conductive sheets 310 will change, thereby changing the capacitance of the capacitor 300. The greater the change in the predetermined distance 320, the greater the change in the capacitance. Thus, the control unit 180 of the circuit device 120 is arranged to monitor changes in the capacitance of the capacitor 300 (i.e. the pressure sensor 150), and is thereby able to monitor changes in the pressure of the surrounding liquid 130 within the housing 110.

The capacitance of a capacitor may be expressed as:

$$C = \varepsilon \cdot \frac{n \cdot A}{d}$$

where $\varepsilon$ is the dielectric permittivity, n is the number of conductive sheets 310 of the capacitor, A is the active area of one of the sheets 310, and d is the predetermined distance 320 between the sheets 310.

From the above expression, it can be seen that as d decreases with increasing pressure, the capacitance of the capacitor 300 will increase (since the other factors do not change for a given capacitor 300). The distance d (i.e. the predetermined distance 320) as function of pressure p may be expressed as:

$$d(p) = d_0 \left(1 - \frac{p}{E}\right)$$

where E is Young's modulus of the capacitor in a direction normal to the active area, p is the hydrostatic pressure, and $d_0$ is the original predetermined distance 320 between the conductive sheets 310 of the capacitor 300. Therefore, by using the above expressions, the pressure within the housing 110 may be calculated as a function of the capacitance of the pressure sensor 150.

However, the use of a standard capacitor 300 as a pressure sensor 150 presents an apparent contradiction and there is an apparent barrier to its use in the circuit device 120. The wireless unit 160 necessarily also includes a capacitor 162, but changes in the capacitance of the capacitor 162 of the wireless unit 160 change the resonant frequency of the LC circuit and therefore degrade the efficiency of the circuit for receiving signals e.g. for power and communication. Thus, on one hand the circuit device 120 should comprise a capacitor 162 in the wireless unit 160 that is not sensitive to changes in pressure of the liquid 130 in the housing 110, and on the other hand should comprise a capacitor as a pressure sensor 150 that is sensitive to pressure changes in the liquid 130 in the housing 110.

Figure 3B:
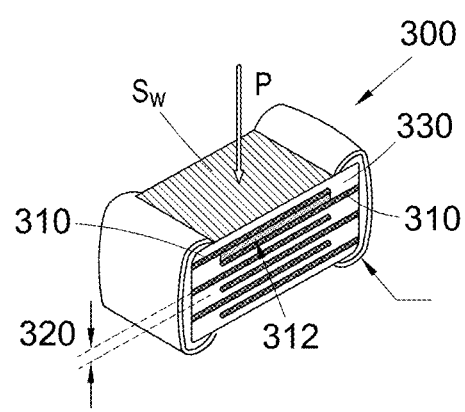
FIG. 3B shows a perspective view of a capacitor for use in a wireless unit of the circuit device of FIG. 2.

To address this issue, the pressure sensor 150 that is provided by a capacitor 300 is arranged to have a larger surface area $S_p$ than the corresponding surface area SW of the capacitor 162 of the wireless unit 160. FIG. 3B shows a standard capacitor 300 which may be used in the LC circuit 160 of the circuit device 120. The capacitor 300 of FIG. 3B is the same type as the capacitor 300 of FIG. 3A, and is not specially adapted for use as a pressure sensor. However, it is smaller than the capacitor 300 of FIG. 3A and therefore has a smaller surface area SW than the equivalent surface area $S_p$ of the capacitor 300 of FIG. 3A. The surface area S of each capacitor is approximately equal to the active area A of the capacitor.

The pressure sensor 150 may therefore be a capacitor with a larger surface area than that of the capacitor 162 of the LC circuit. The pressure sensor 150 and the capacitor 162 of the wireless unit 160 may be the same type of capacitor 300, and may both be simple, standard capacitors. The pressure sensor 150 may have a surface area S large enough that the capacitor exhibits changes in its capacitance over the expected range of pressures (e.g. 0 bar to 25 bar), and the capacitor 162 may have a surface area smaller than that of the pressure sensor 150 so that it is substantially insensitive to pressure changes over the expected range. The pressure sensor 150 may have a surface area S, more than twice that of the capacitor 162, or more than five times that of the capacitor 162, more than ten times that of the capacitor 162, more than fifty times that of the capacitor 162, or more than a hundred times that of the capacitor 162.

That is, despite the need for the capacitor 162 of the wireless unit 160 of the circuit device 120 to have a capacitance which is substantially invariant under pressure changes within a suitable range, a second capacitor may be used as a pressure sensor 150 by providing that second capacitor with a larger surface area S. Thus, the pressure sensor 150 may be sensitive to pressure changes in the liquid 130, while the capacitor 162 of the wireless unit 162 is not sensitive to pressure changes in the liquid 130.

The circuit device 120 thus comprises a capacitor 300 arranged to detect changes in pressure in the liquid 130 of the sprinkler bulb 100 by variation of its capacitance. The control unit 180 detects the changes in the capacitance of the pressure sensor 150 and may correlate those changes to changes in pressure of the liquid 130. It is therefore possible to test whether or not the sprinkler bulb 100 is in working order, as described above.

Figure 4:
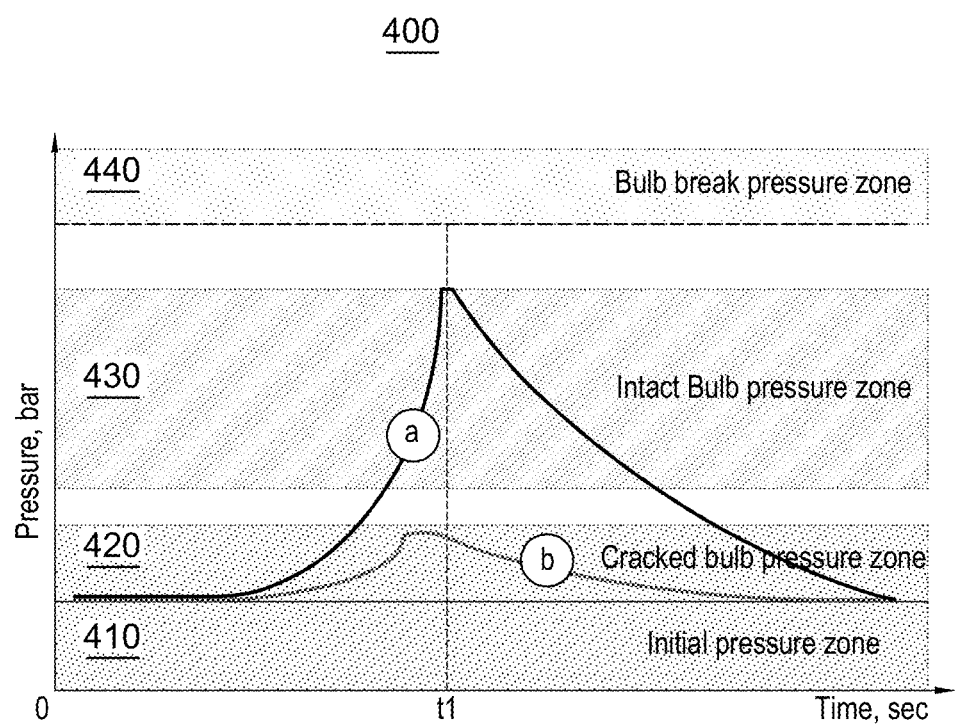
FIG. 4 shows a schematic indicating characteristic pressure regions of the sprinkler bulb during heating.

FIG. 4 shows an example of various diagnostic ranges during a process for detecting a cracked sprinkler bulb. Different ranges, zones, and values may be used for different configurations of a particular sprinkler bulb. For example, the curves a and b of FIG. 4 are a function of the volume of liquid and gas in the housing 110, the type of liquid and gas, the type of material used for the frangible housing 110 etc.

FIG. 4 shows pressure changes in the housing measured by the control unit 180 during testing of the bulb 100 and heating of the liquid 130. The horizontal axis indicates the time after the heating unit 170 is activated, and the vertical axis indicates the pressure that is measured at a particular time. In a bulb 100 that is in working order, the heating unit 170 is expected to raise the temperature of the liquid 130, and hence increase the pressure in the housing 110, by a certain amount within a predetermined time period t1. The point t1 can therefore be used as a reference point to test the integrity of the bulb 100.

During testing, the pressure starts in an initial pressure zone 410, indicative a pressure range at which the bulb 100 is ready for use e.g. prior to heating or a fire event. The pressure of the bulb 100 would be expected to be in this range if intact and when not heated. If the bulb 100 is in working order (i.e. not damaged) the pressure will increase approximately along curve a. That is, the pressure increases with increasing time (i.e. increasing temperature). Heating of the liquid 130 is stopped at time t1, and the pressure in the housing then falls again as the liquid 130 cools. The pressure therefore does not reach zone 440, wherein the housing 110 of the bulb 100 is expected to break e.g. as would be the case in a fire event. However, the pressure does enter zone 430 in which the pressure of the liquid 130 increases with time and reaches a relatively high level. Zone 430 is therefore indicative of an intact bulb 100, and hence a bulb 100 which is in working order.

If the bulb 100 is not in working order (e.g. it is cracked) the pressure will increase approximately along curve b. On curve b, the pressure starts to increase with heating but soon plateaus. It is therefore evident that the pressure in the housing 110 will not reach zone 440, or even zone 430, and will not be sufficient to cause the housing 110 to shatter, despite the continued application of heat to the liquid 130 of the bulb 100. Therefore, the sprinkler bulb 100 is not safe to use.

During testing, the temperature sensor 172 of the circuit can be used to check that temperature is increasing as expected, to ensure that diagnoses may be attributed to the condition of the housing 110, rather that e.g. a faulty heating unit 170.

Sprinkler bulbs typically have diameters between about 2.5 mm to 12 mm, and lengths between about 19 mm to 28 mm, depending on the requirement. The circuit device 120 may have a width of about 1 mm to 10 mm, and a length of about 10 mm to 25 mm. The circuit device 120 may have a size of about 3 mm by 18 mm. The circuit device may have any suitable size so that it fits within a conventional sprinkler bulb.

Capacitors are typically standard sizes, and since the pressure sensor 150 may be simple capacitor (e.g. not specially adapted for use as a pressure sensor), it may be selected from standard industry-used sizes. The capacitor 162 of the wireless unit 160 may similarly be selected from standard sizes. Standard capacitor sizes are typically expressed as a 4-digit code indicating the width and length dimensions in fractions of an inch. For example, a 0805 capacitor has a width of about 0.08" (2 mm) and a length of about 0.05" (1 mm). The pressure sensor 150 may be one standard size larger than the capacitor 162 of the wireless unit 160, or may be a plurality of standard sizes larger. For example, the pressure sensor may be a 0805 capacitor (i.e. 2.0 mm by 1.25 mm), and the capacitor 162 of the wireless unit 160 may be a 0402 capacitor (i.e. 1.0 mm by 0.5 mm), or a 0201 capacitor (e.g. 0.6 mm by 0.3 mm).

According to the invention, autonomous and remote testing of sprinkler bulbs 100 may be accomplished. Bulbs 100 may be checked regularly by a central system and faulty bulbs 100 may be flagged for replacement. Further, the invention provides a simple and reliable pressure sensor 150 by recognising that a capacitor 300 may be used as a pressure sensor 150, so long as it is sized appropriately to be sensitive to ambient pressure changes.

What is claimed is:

1. A sprinkler bulb comprising a sealed frangible housing (110), and a circuit device (120) sealed within the housing and without external wired connections, wherein the circuit device comprises:
   a capacitor (150) within the housing (110) arranged to be used as a pressure sensor to detect pressure changes within the housing (110);
   a heating element operable to heat fluid within the housing of the sprinkler bulb, and
   a control unit configured to monitor changes in the capacitance of the capacitor and thereby use the capacitor as a pressure sensor.

2. A sprinkler bulb as claimed in claim 1, wherein the circuit device (120) is arranged to detect a change in a capacitance of the capacitor (150).

3. A sprinkler bulb as claimed in claim 1, wherein the capacitor (150) comprises a plurality of conductive layers (310) separated by a predetermined distance (320), and wherein the capacitor (150) is arranged to deform under pressure so that the predetermined distance (320) changes.

4. A sprinkler bulb as claimed in claim 1, wherein the capacitor (150) is a first capacitor, wherein the circuit device (120) comprises a wireless unit (160) for wirelessly receiving power and/or signals from outside the housing (110), and wherein the wireless unit (160) comprises a second capacitor (162).

5. A sprinkler bulb as claimed in claim 4, wherein a change in a capacitance of the first capacitor (150) with pressure is greater than a change in a capacitance of the second capacitor (162) with pressure.

6. A sprinkler bulb as claimed in claim 4, wherein the first capacitor (150) has a greater surface area than the second capacitor (162).

7. A sprinkler bulb as claimed in claim 1, wherein the capacitor (150) is a simple capacitor.

8. A sprinkler bulb as claimed in claim 1, wherein the capacitor (150) is arranged to be used to measure pressure up to 2.5 MPa.

9. A sprinkler comprising a bulb as claimed in claim 1, wherein the bulb is arranged to prevent release of a suppressant unless it breaks.

10. A sprinkler system comprising a sprinkler bulb as claimed in claim 1, comprising a system controller arranged to cause the circuit device (120) of the sprinkler bulb to heat fluid (130) in the bulb, to measure the pressure of fluid (130) within the bulb using the capacitor (150), and to determine that the bulb is in working condition if the measured pressure reaches a predetermined threshold and to determine that the bulb is not in working condition if the measured pressure does not reach the predetermined threshold.

11. A method of measuring pressure inside a sprinkler bulb comprising a sealed frangible housing (110), and a circuit device (120) sealed within the housing and without external wired connections, the method comprising using a capacitor (150) of the circuit device within the housing (110) as a pressure sensor to detect pressure changes within the housing (110); and
   heating fluid (130) in the housing (110), and determining that the bulb is in working order if pressure in the housing (110) reaches a predetermined threshold, and determining that the bulb is not in working order if pressure in the housing (110) does not reach the predetermined threshold.

12. A method as claimed in claim 11, comprising determining a pressure change within the housing (110) based on a change of capacitance of the capacitor (150).

13. A method as claimed in claim 11, wherein the capacitor (150) is a first capacitor, the method comprising providing a wireless unit (160) for wirelessly receiving power and/or signals from outside the housing (110) as part of the circuit device (120), and providing as part of the wireless unit (160) a second capacitor (162) having a capacitance less sensitive to pressure changes than the first capacitor (150).

14. A method as claimed in claim 13, comprising providing the second capacitor (162) to have a surface area less than that of the first capacitor (150).

15. A sprinkler bulb comprising a sealed frangible housing, and a circuit device within the housing, wherein the circuit device comprises a capacitor arranged to be used as a pressure sensor,
   wherein the capacitor is a first capacitor, wherein the circuit device comprises a wireless unit for wirelessly receiving power and/or signals from outside the housing, and wherein the wireless unit comprises a second capacitor, and
   wherein the first capacitor has a greater surface area than the second capacitor.

* * * * *